(12) United States Patent
Ouyang et al.

(10) Patent No.: US 11,458,636 B2
(45) Date of Patent: Oct. 4, 2022

(54) WIRELESSLY POWERED AND CONTROLLED ROBOTIC APPARATUS

(71) Applicant: Dong Ouyang, Edina, MN (US)

(72) Inventors: Dong Ouyang, Edina, MN (US); Thomas Ouyang, Edina, MN (US); Eric Ouyang, Edina, MN (US)

( * ) Notice: Subject to any disclaimer, the term of this patent is extended or adjusted under 35 U.S.C. 154(b) by 366 days.

(21) Appl. No.: 16/877,747

(22) Filed: May 19, 2020

(65) Prior Publication Data

US 2021/0362346 A1 Nov. 25, 2021

(51) Int. Cl.
| | | |
|---|---|---|
| *B25J 5/02* | (2006.01) | |
| *B25J 13/00* | (2006.01) | |
| *B25J 19/00* | (2006.01) | |
| *B25J 9/12* | (2006.01) | |
| *B25J 5/00* | (2006.01) | |

(Continued)

(52) U.S. Cl.
CPC ............. *B25J 13/006* (2013.01); *B25J 3/04* (2013.01); *B25J 5/007* (2013.01); *B25J 5/02* (2013.01); *B25J 9/104* (2013.01); *B25J 9/12* (2013.01); *B25J 9/1679* (2013.01); *B25J 9/1694* (2013.01); *B25J 11/0055* (2013.01); *B25J 11/0065* (2013.01); *B25J 13/086* (2013.01); *B25J 13/088* (2013.01); *B25J 19/0045* (2013.01)

(58) Field of Classification Search
CPC ........ B25J 11/0065; B25J 13/006; B25J 5/02; B25J 19/0045; B25J 9/026; B25J 13/088; B25J 9/161; B25J 9/1694; B25J 9/104; B25J 11/0055; B25J 9/1679; B25J 13/086; B25J 9/102; B25J 3/04; B25J 9/12; B25J 5/007; G05B 2219/33203
See application file for complete search history.

(56) References Cited

U.S. PATENT DOCUMENTS

| | | |
|---|---|---|
| 5,651,547 A | 7/1997 | Rannelli |
| 6,564,957 B2 | 5/2003 | Caldwell |

(Continued)

FOREIGN PATENT DOCUMENTS

| | | |
|---|---|---|
| CN | 207344574 | 5/2018 |
| CN | 109626002 | 4/2019 |
| CN | 10146094 | 8/2019 |

OTHER PUBLICATIONS

Bakri et al., Wireless Hand Gesture Controlled Robotic Arm Via NRF24L01 Transceiver, 2019, IEEE, p. 16-22 (Year: 2019).*

(Continued)

*Primary Examiner* — Marc McDieunel

(57) ABSTRACT

A wirelessly powered and controlled robotic apparatus enabling performance of tasks within a three-dimensional space includes a rail, a robotic unit, and a tool. The rail comprises negative and second paths to carry an electrical current. The robotic unit comprises a microcontroller having a drive motor and a transceiver engaged thereto and is engaged to and electrically coupled to the rail. A transfer unit is engaged to both the drive motor and the rail and thus can translate rotation of the drive motor to a force to motivate the robotic unit along the rail. The microcontroller selectively actuates the transfer unit to move the robotic unit along the rail to a location. The transceiver receives commands wirelessly from a control unit and transmits data thereto. The tool is engaged to the robotic unit and can perform a task at, or proximate to, the location.

19 Claims, 10 Drawing Sheets

(51) Int. Cl.
  *B25J 9/10*   (2006.01)
  *B25J 11/00*  (2006.01)
  *B25J 9/16*   (2006.01)
  *B25J 13/08*  (2006.01)
  *B25J 3/04*   (2006.01)

(56) References Cited

U.S. PATENT DOCUMENTS

| | | | |
|---|---|---|---|
| 6,668,991 | B2 | 12/2003 | Canaday |
| 6,751,048 | B2 | 6/2004 | Ostwald |
| 6,760,644 | B2 | 7/2004 | Canaday |
| 6,871,596 | B2 | 3/2005 | De-Gol |
| 7,286,903 | B2 | 10/2007 | Sehnert |
| 9,601,265 | B2 | 3/2017 | Sugino |
| 9,715,895 | B1 | 7/2017 | Smith |
| 10,039,219 | B1 | 7/2018 | Vangal-Ramamurthy |
| 2010/0031856 | A1 | 2/2010 | Shoda |
| 2014/0129061 | A1* | 5/2014 | Cooper ............... H04L 63/00 701/19 |
| 2015/0200712 | A1* | 7/2015 | Cooper ............... H04W 28/08 375/257 |
| 2015/0217790 | A1* | 8/2015 | Golden ............... B60T 17/228 701/19 |
| 2016/0359741 | A1* | 12/2016 | Cooper ............... H04W 4/44 |
| 2018/0104829 | A1* | 4/2018 | Altman ............... B25J 5/007 |

OTHER PUBLICATIONS

James et al., Intelligent track cleaning robot, 2016, IEEE, p. 332-357 (Year: 2016).*

Ismail et al., Investigation of homogeneous multi robots communication via Bluetooth, 2012, IEEE, p. 1-6 (Year: 2012).*

Anyapo, Development of Long Rail Dynamic Wireless Power Transfer for Battery-Free Mobile Robot, 2019, IEEE, p. 588-593 (Year: 2019).*

* cited by examiner

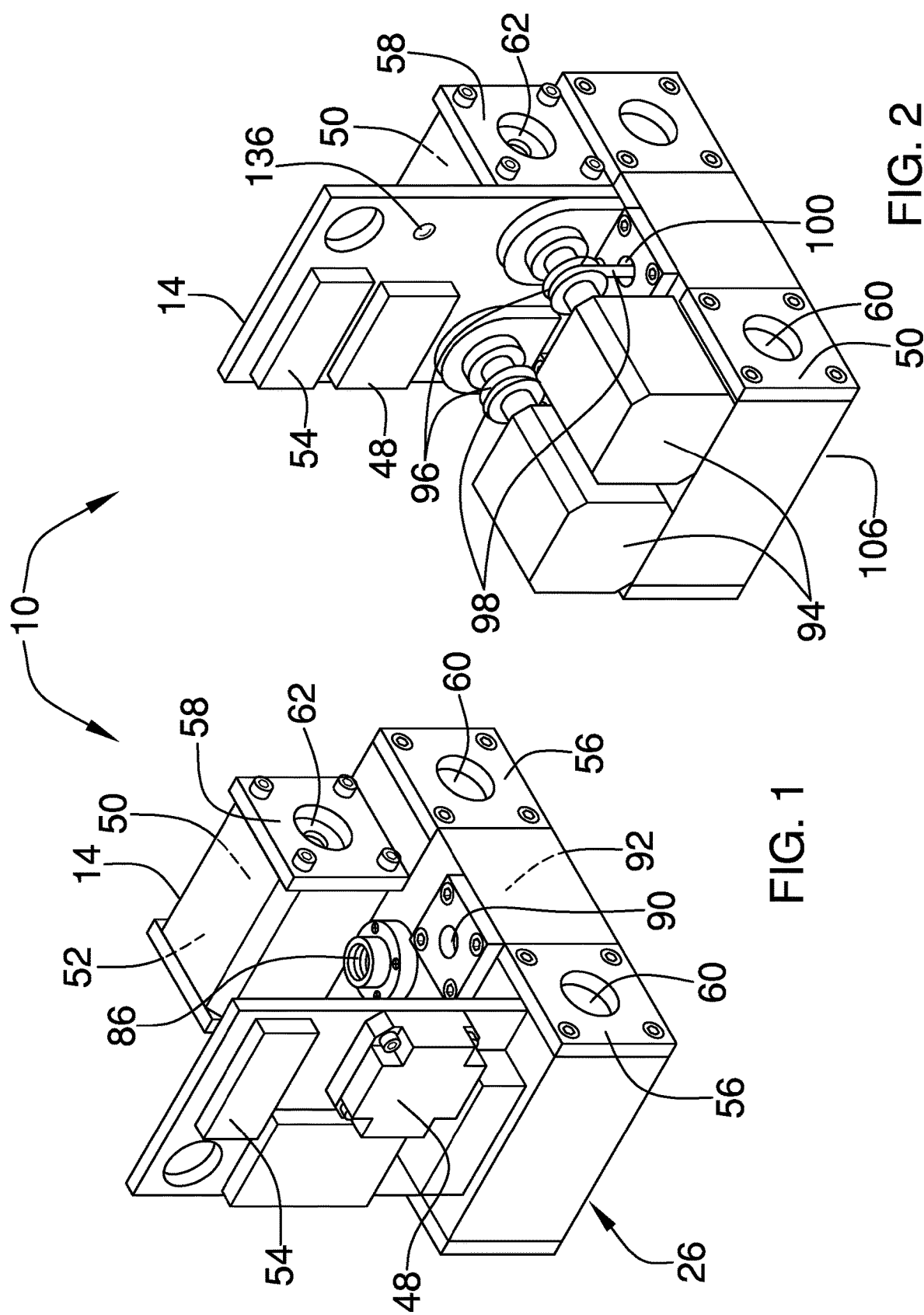

WIRELESSLY POWERED AND CONTROLLED ROBOTIC APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to robotic apparatus and more particularly pertains to a new robotic apparatus enabling performance of tasks within a three-dimensional space.

(2) Description of Related Art Including Information Disclosed Under 37 CFR 1.97 and 1.98

The prior art relates to robotic apparatuses. Prior art robotic apparatuses may comprise a robotic unit powered via magnetic resonance induction from an electrified rail. Prior art robotic apparatuses also may comprise a robotic unit that obtains power and commands through corresponding sets of brushes that engage a rail.

BRIEF SUMMARY OF THE INVENTION

An embodiment of the disclosure meets the needs presented above by generally comprising a rail, a robotic unit, and a tool. The rail comprises a first path and a second path and thus is configured to carry an electrical current. The robotic unit is engaged to the rail and is electrically coupled thereto. The robotic unit comprises a microcontroller, a drive motor, a transfer unit, and a transceiver. The drive motor is operationally engaged to the microcontroller. The transfer unit is operationally engaged to both the drive motor and the rail and thus is positioned to translate rotation of the drive motor to a force for motivating the robotic unit along the rail. The microcontroller is positioned to actuate the transfer unit to motivate the robotic unit along the rail to a location without use of wires to provide power and to transmit commands. The transceiver is operationally engaged to the microcontroller and is configured to receive locating commands wirelessly from a control unit, and to transmit data thereto. The tool is engaged to the robotic unit and is configured to perform a task at, or proximate to, the location.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is an isometric perspective view of a robotic unit of a first configuration, which comprises an element of a wirelessly powered and controlled robotic apparatus according to an embodiment of the disclosure.

FIG. 2 is an isometric perspective view of a robotic unit of the first configuration, which comprises an element of a wirelessly powered and controlled robotic apparatus according to an embodiment of the disclosure.

DETAILED DESCRIPTION OF THE INVENTION

Figure 3:
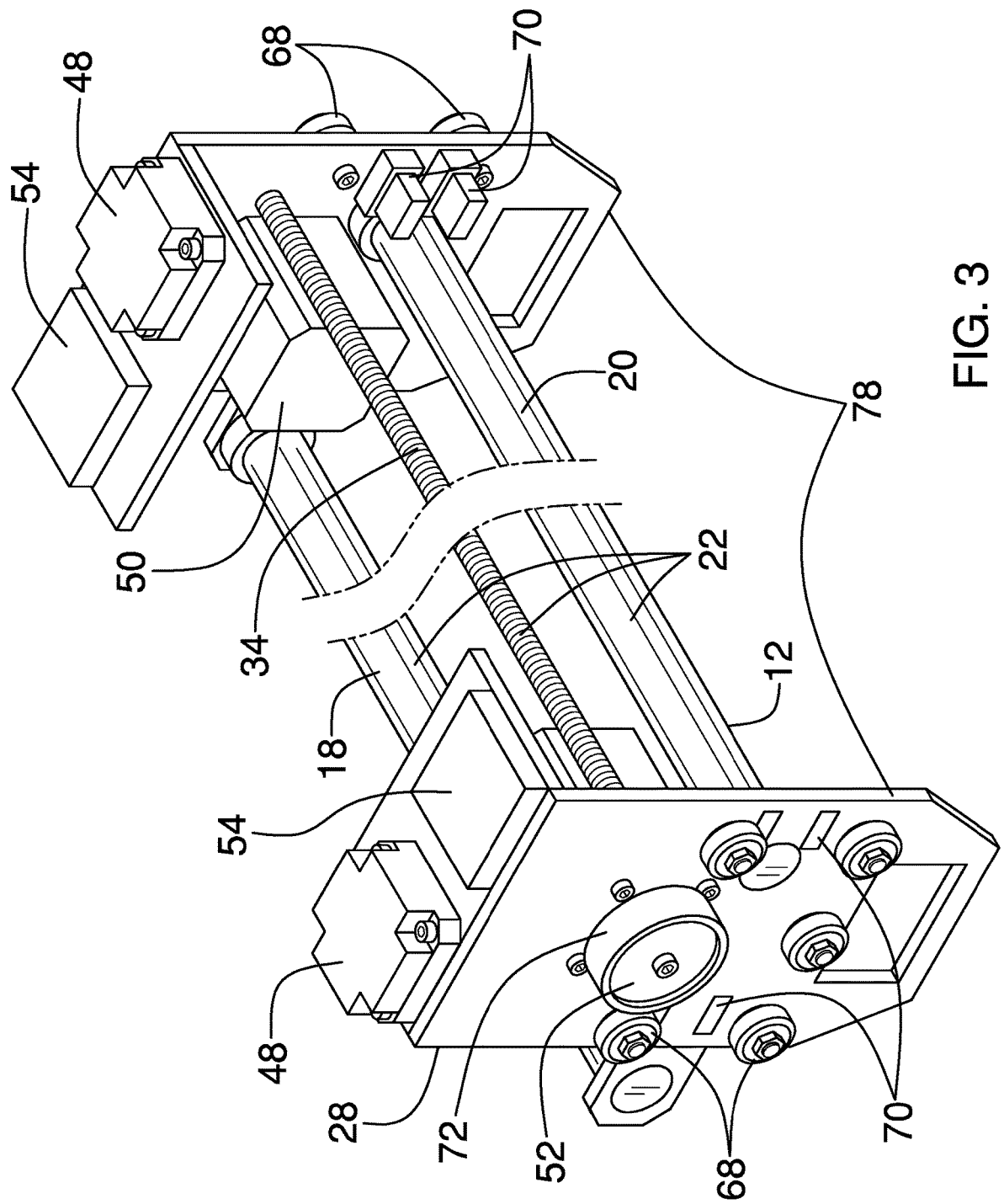
FIG. 3 is an isometric perspective view of a robotic unit of a second configuration, which comprises an element of a wirelessly powered and controlled robotic apparatus according to an embodiment of the disclosure.

With reference now to the drawings, and in particular to FIGS. 1 through 11 thereof, a new robotic apparatus embodying the principles and concepts of an embodiment of the disclosure and generally designated by the reference numeral 10 will be described.

As best illustrated in FIGS. 1 through 11, the wirelessly powered and controlled robotic apparatus 10 generally comprises a rail 12, a robotic unit 14, and a tool 16. The rail 12 comprises a first path 18 and a second path 20 and thus is configured to carry an electrical current, thus allowing the robotic unit 14 to be powered without use of wires, that is, wirelessly powered. The rail 12 may comprise at least one of a first type 22 and a second type 24, which should be understood to mean only one or more rails 12 of the first type 22, only one or more rails 12 of the second type 24, or one or more rails 12 of the first type 22 and one or more rails 12 of the second type 24. The robotic unit 14 may comprise at least one of a first configuration 26 and a second configuration 28, which should be understood to mean only one or more robotic units 14 of the first configuration 26, only one or more robotic units 14 of the second configuration 28, or one or more robotic units 14 of the first configuration 26 and one or more robotic units 14 of the second configuration 28.

Figure 5:
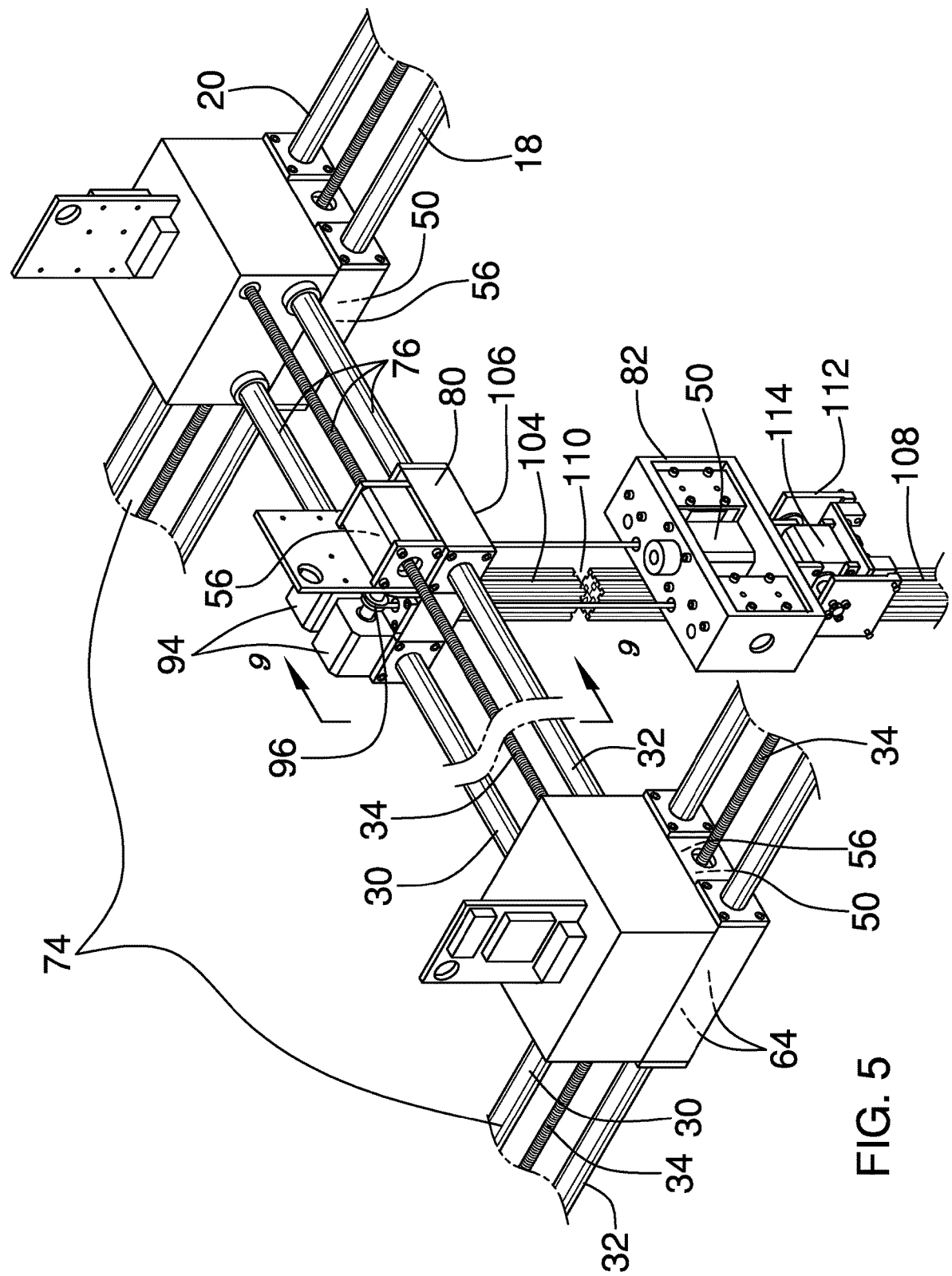
FIG. 5 is an isometric perspective view of an embodiment of the disclosure.
Figure 6:
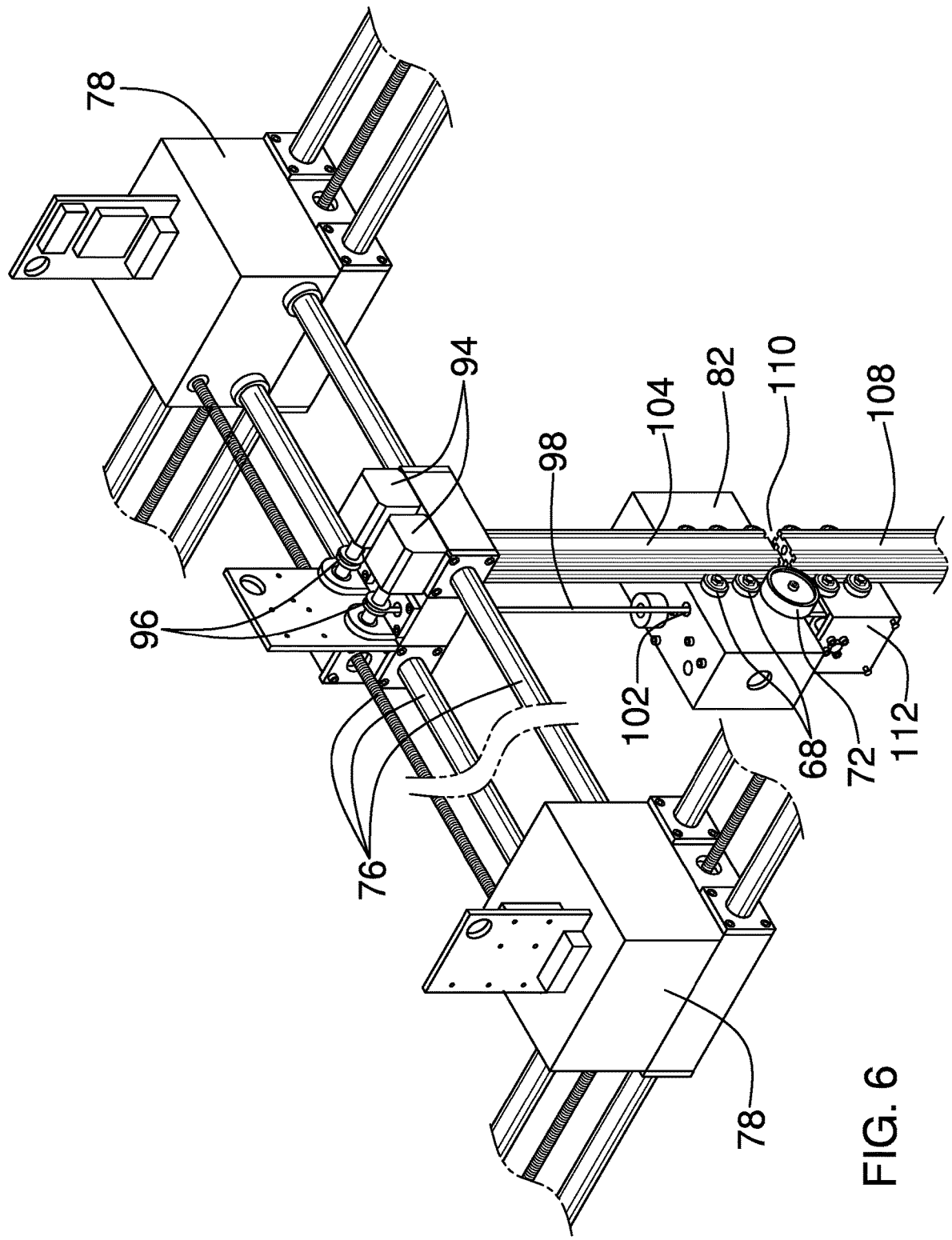
FIG. 6 is an isometric perspective view of an embodiment of the disclosure.

The rail 12 of the first type 22, as shown in FIGS. 3, 5, and 6, comprises a first rod 30, which provides the first path 18, a second rod 32, which provides the second path 20 and which extends in parallel with the first rod 30. The rail 12 of the first type 22 also comprises a threaded rod 34, which extends in parallel with the second rod 32 and the first rod 30.

Figure 4:
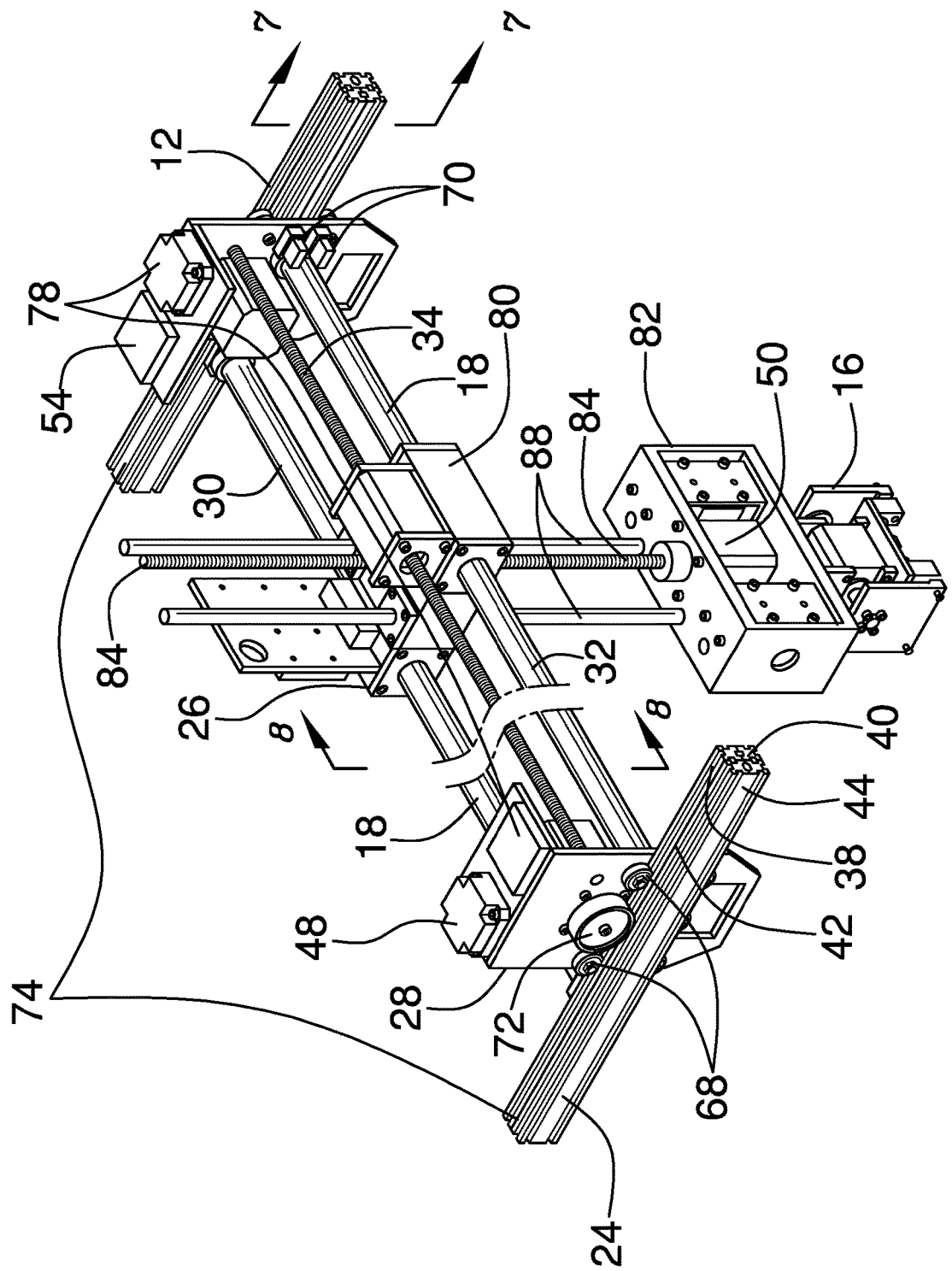
FIG. 4 is an isometric perspective view according to an embodiment of the disclosure.

The rail 12 of the second type 24, two of which are shown in parallel in FIG. 4, comprises a first track 38, which provides the first path 18, and a second track 40, which provide the second path 20 and extends in parallel with the first track 38. The second track 40 and the first track 38 each define a slot 42, which extends longitudinally along the rail 12.

Figure 7:
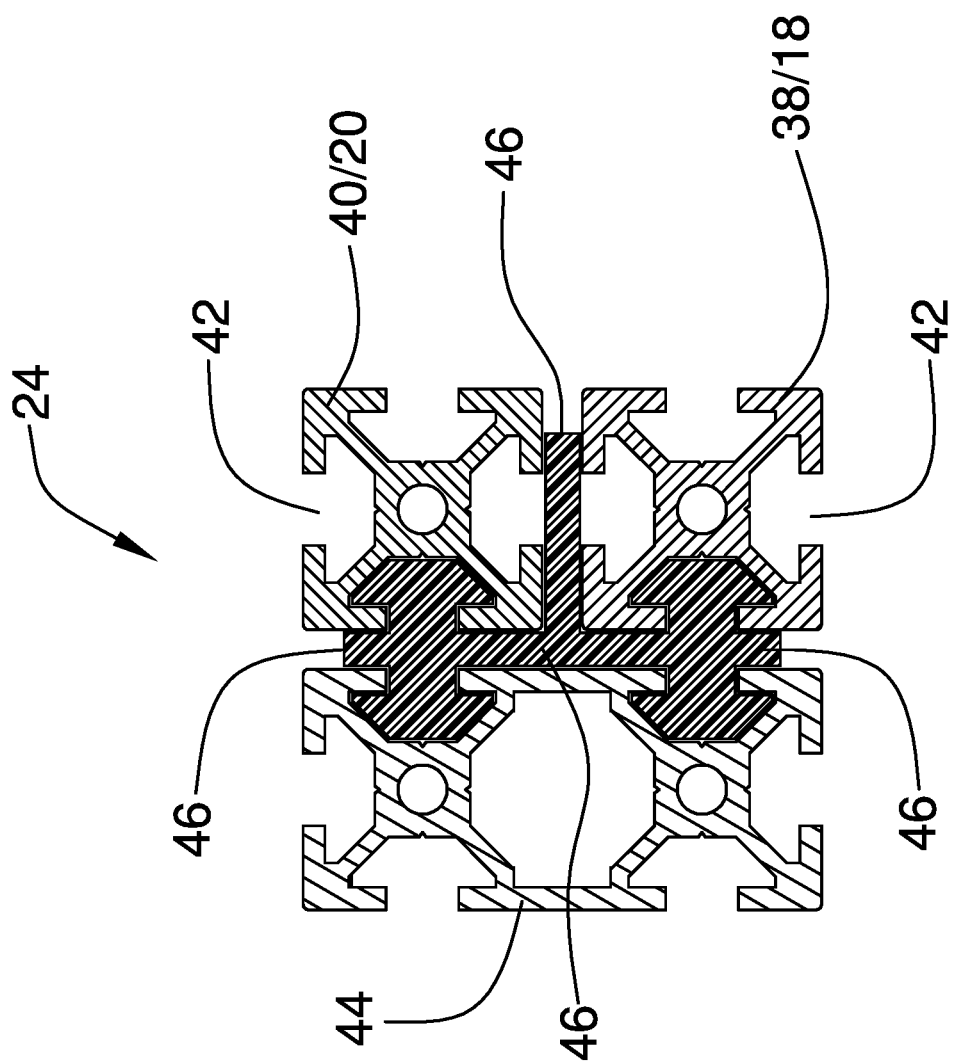
FIG. 7 is an end view of an embodiment of the disclosure.
Figure 8:
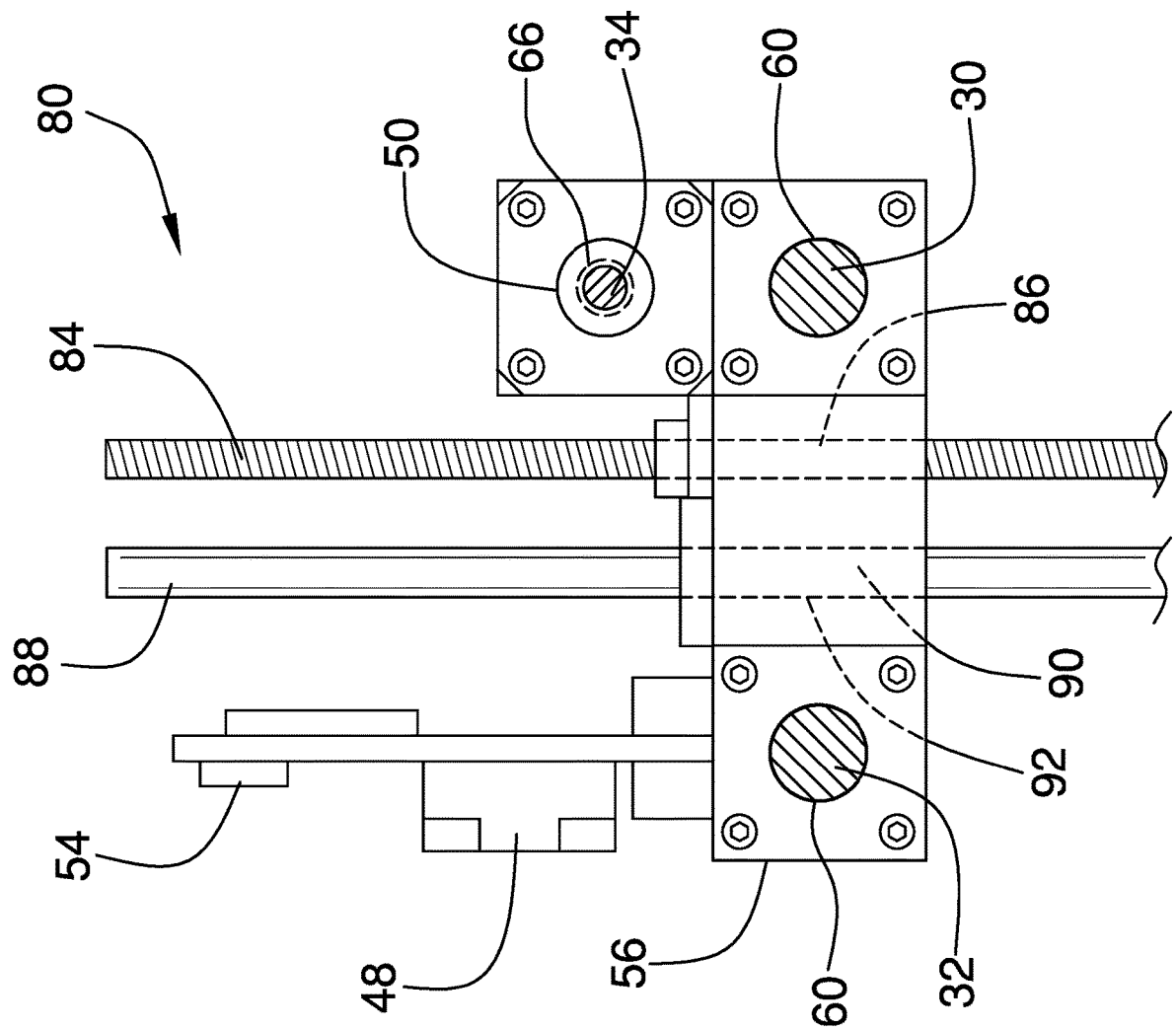
FIG. 8 is a side view of an embodiment of the disclosure.
Figure 9:
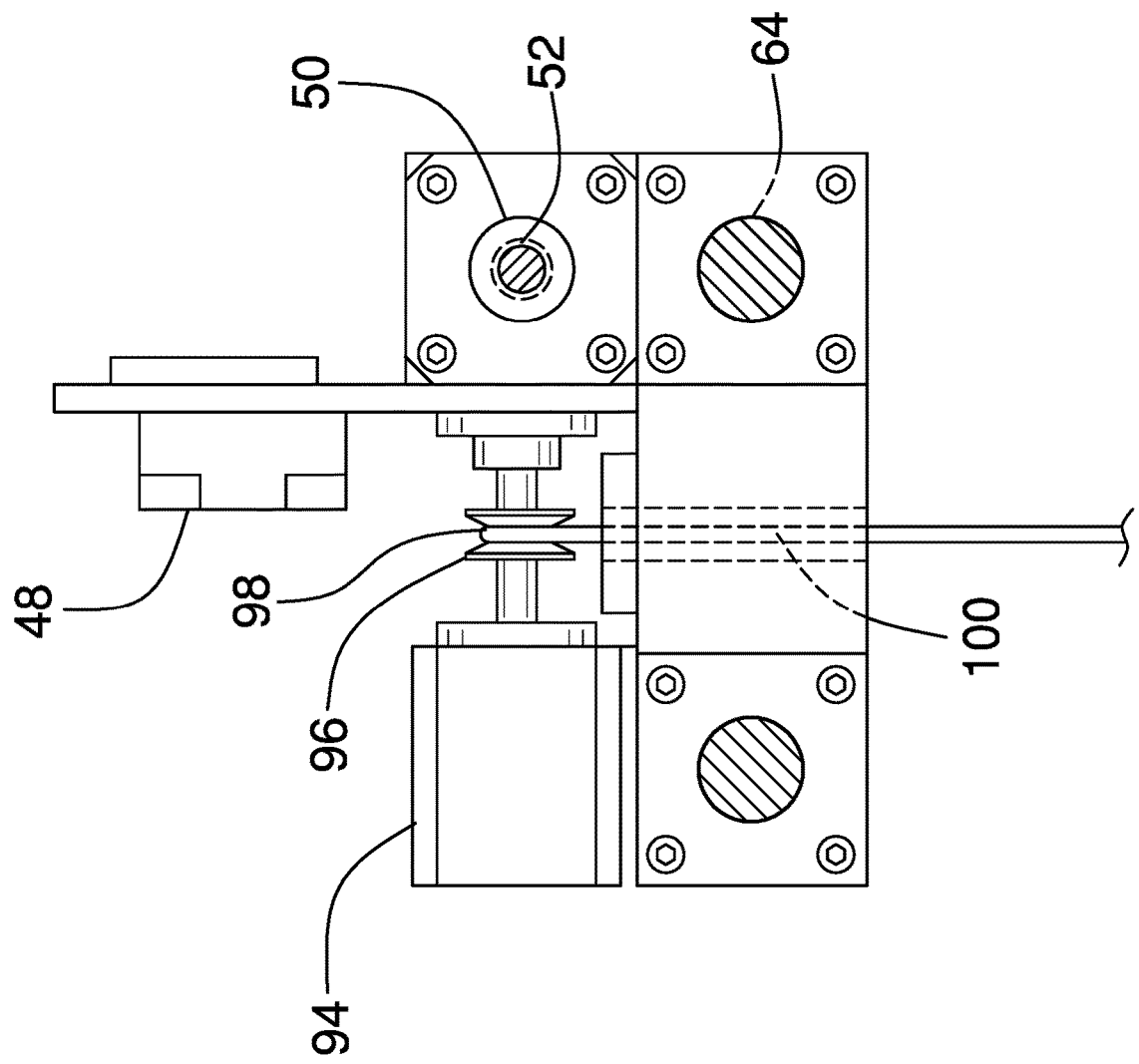
FIG. 9 is a side view of an embodiment of the disclosure.

The rail 12 of the second type 24 also comprises a bar 44 and a connector 46. The bar 44 extends in parallel with the first track 38 and the second track 40. The connector 46 is engaged to and extends between the first track 38, the second track 40, and the bar 44. The connector 46 is electrically insulating so that the first track 38 is insulated from the second track 40, and so that both the first track 38 and the second track 40 are insulated from the bar 44. An end view of a rail 12 of the second type 24 is shown in FIG. 7. A rail 12 of the second type 24 may be manufactured via an extrusion process.

The robotic unit 14 is engaged to the rail 12 and is electrically coupled thereto. The robotic unit 14 comprises a microcontroller 48, a drive motor 50, a transfer unit 52, and a transceiver 54. The drive motor 50 is operationally engaged to the microcontroller 48. The transfer unit 52 is operationally engaged to both the drive motor 50 and the rail 12 and thus is positioned to translate rotation of the drive motor 50 to a force for motivating the robotic unit 14 along the rail 12.

The microcontroller 48 is positioned actuate the transfer unit 52 to motivate the robotic unit 14 along the rail 12 to a location. The transceiver 54 is operationally engaged to the microcontroller 48 and is configured to receive locating commands wirelessly from a control unit, and to transmit data thereto. The tool 16 is engaged to the robotic unit 14 and is configured to perform a task at, or proximate to, the location. The microcontroller 48 allows the robotic unit 14 to be controlled without use of wires, that is, wirelessly controlled.

The robotic unit 14 of the first configuration 26 comprises a pair of first blocks 56 and a second block 58, which are engaged to the robotic unit 14. Each first block 56 has a first channel 60 extending therethrough and the second block 58 has a second channel 62 extending therethrough. The first channels 60 and second channel 62 are parallel. Each of the second rod 32 and the first rod 30 is positioned through an associated first channel 60, while the threaded rod 34 is positioned through the second channel 62.

The robotic unit 14 of the first configuration 26 also comprises a set of connecting flanges 64, which is engaged to the pair of first blocks 56. Each connecting flange 64 extends into an associated first channel 60 and is operationally engaged to the microcontroller 48. The connecting flange 64 is positioned to slidably engage a respective one of the first rod 30 and second rod 32 to electrically engage the robotic unit 14 to the rail 12.

The transfer unit 52 in the robotic unit 14 of the first configuration 26 comprises a drive shaft 66. The drive shaft 66, which is hollow and internally threaded, is engaged to the drive motor 50. The threaded rod 34 extends through and is threadedly engaged to the drive shaft 66. The drive motor 50 is positioned to rotate the drive shaft 66 to motivate the robotic unit 14 along the rail 12.

The robotic unit 14 of the second configuration 28 comprises a set of guide wheels 68 and a set of brushes 70, as shown in FIG. 3. Each guide wheel 68 is rotationally engaged to the robotic unit 14 and is positioned in a respective slot 42, as shown in FIG. 4, so that the set of guide wheels 68 is positioned to engage the robotic unit 14 to the rail 12.

Each brush 70 is engaged to the robotic unit 14 and is operationally engaged to the microcontroller 48. The brush 70 is positioned to slidably engage a respective one of the first track 38 and the second track 40 to electrically engage the robotic unit 14 to the rail 12.

The transfer unit 52 of the robotic unit 14 of the second configuration 28 comprises a drive wheel 72, which is engaged to both the drive motor 50 and the rail 12. The drive motor 50 is positioned to rotate the drive wheel 72 to motivate the robotic unit 14 along the rail 12.

Figure 11:
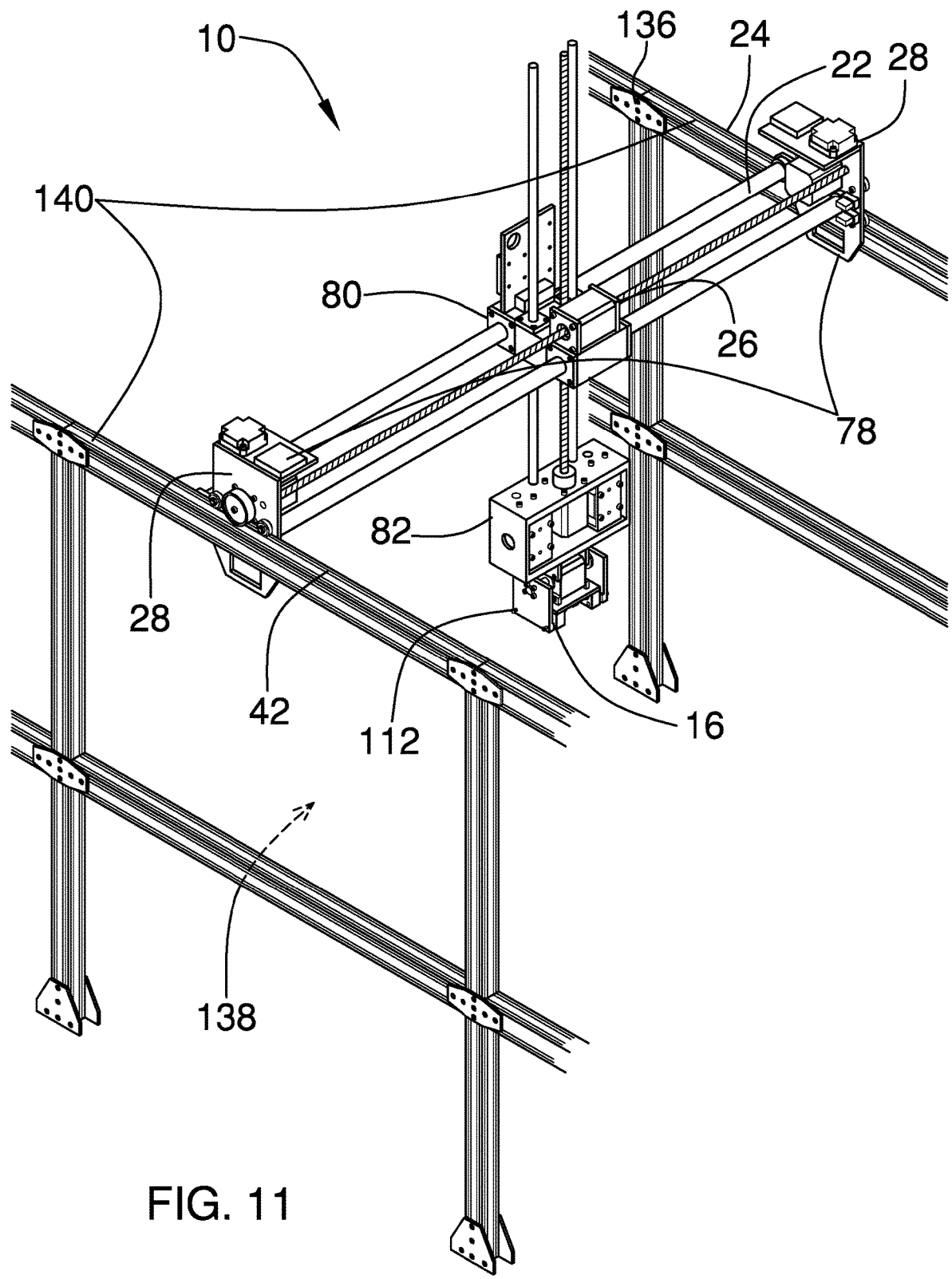
FIG. 11 is an isometric perspective view of an embodiment of the disclosure.

In one embodiment, as shown FIGS. 4-6 and 11, the rail 12 may comprise a pair of siderails 74 and a crossrail 76. The siderails 74 are coplanar and parallel and are at least one of the first type 22, as shown in FIG. 5, and the second type 24, as shown in FIG. 4. The crossrail 76 is of the first type 22, as shown in FIGS. 4, 5, and 11, and the second type, 24 (not shown).

The robotic unit 14 of this embodiment comprises a pair driving robots 78 and a working robot 80. Each driving robot 78 is engaged to a respective siderail 74 of the pair of siderails 74. The crossrail 76 is engaged to and extends between the driving robots 78 and is electrically coupled to at least one of the driving robots 78. The driving robots 78 are at least one of the first configuration 26, as shown in FIG. 5, and the second configuration 28, as shown in FIG. 4.

The working robot 80 of this embodiment is engaged to and is electrically coupled to the crossrail 76. The working robot 80 is of the first configuration 26. The tool 16 may be engaged to the working robot 80 so that the working robot 80 is configured to perform the task at the location. The apparatus 10 of this embodiment is anticipated to be useful in manufacturing automations that include, but are not limited to, Computer Numerical Control cutting, 3D printing, drilling, and the like.

Alternatively, as shown in FIGS. 4 and 5, a slave robot 82 may be engaged to and selectively extendible from the working robot 80, with the tool 16 being engaged to the slave robot 82. The slave robot 82 thus is positioned to actuate the tool 16 to perform the task at the location. In addition to the potential applications listed above, the apparatus 10 of this embodiment is anticipated to be useful in repositioning objects over short distances.

In one embodiment, as shown in FIG. 4, the slave robot 82 comprises a threaded shaft 84, which is engaged to and which extends from the drive motor 50. The threaded shaft 84 is positioned through a threaded channel 86, which is positioned vertically through the working robot 80, so that the threaded shaft 84 is operationally engaged to the working robot 80.

A pair of guide rods 88 is coupled to the slave robot 82 and extends in parallel with the threaded shaft 84. Each guide rod 88 extends through an associated guide channel 90, which is positioned vertically through the working robot 80.

A set of connecter flanges 92 is engaged to the working robot 80. Each connecter flange 92 extends into an associated guide channel 90 and is operationally engaged to the microcontroller 48 of the working robot 80. Each connecter flange 92 is positioned to slidably engage a respective guide rod 88 so that the pair of guide rods 88 is electrically coupled to the rail 12 to electrically engage the slave robot 82 to the rail 12. The drive motor 50 of the slave robot 82 is positioned to selectively rotate the threaded shaft 84 to lift itself toward the working robot 80.

In another embodiment, as shown in FIG. 5, a pair of lift motors 94 is engaged to the working robot 80 and is electrically coupled to the rail 12. A pair of pulleys 96 is engaged singly to the lift motors 94 and is electrically coupled to the rail 12. A pair of cables 98 is engaged singly to the pulleys 96 so that the cables 98 are electrically coupled to the rail 12. Each cable 98 extends from a respective pulley 96 through an associated hole 100 in the working robot 80. A distal terminus 102 of the cable 98, which is positioned below the working robot 80, is engaged to the slave robot 82. The working robot 80 is positioned to selectively actuate the lift motors 94 to lower the slave robot 82 to a position below the working robot 80. The slave robot 82 then is positioned to actuate the tool 16 to perform the task at the location.

In a related embodiment, a sub-rail 104 is engaged to and extends perpendicularly from a lower face 106 of the working robot 80, as shown in FIG. 5. A guide rail 108 is engaged to a surface proximate to the location and extends perpendicularly therefrom. The microcontrollers 48 are positioned to selectively actuate the drive motors 50 of the driving robots 78 and the working robot 80 to motivate the robotic unit 14 along the siderails 74 and crossrail 76, respectively, to a position wherein the sub-rail 104 is substantially linearly aligned with the guide rail 108, defining a gap 110.

The slave robot 82 is selectively engageable to the sub-rail 104 and the guide rail 108 and is configured to traverse the gap 110. The slave robot 82 is selectively positionable upon one or the other of the sub-rail 104 and the guide rail 108. The slave robot 82, positioned upon the sub-rail 104, can be delivered by the driving robots 78 and the working robot 80 to a position proximate to the guide rail 108. The slave robot 82 then can traverse the gap 110 to the guide rail 108 and can be lowered to the location upon the cables 98.

The tool 16 may be configured to selectively attach to an object, positioning the object to be lifted toward the working robot 80. The tool 16 also may be intended for woodworking automaton, Computer Numerical Control machining, etching, welding, cutting, grinding, edging, tooling, and the like.

Figure 10:
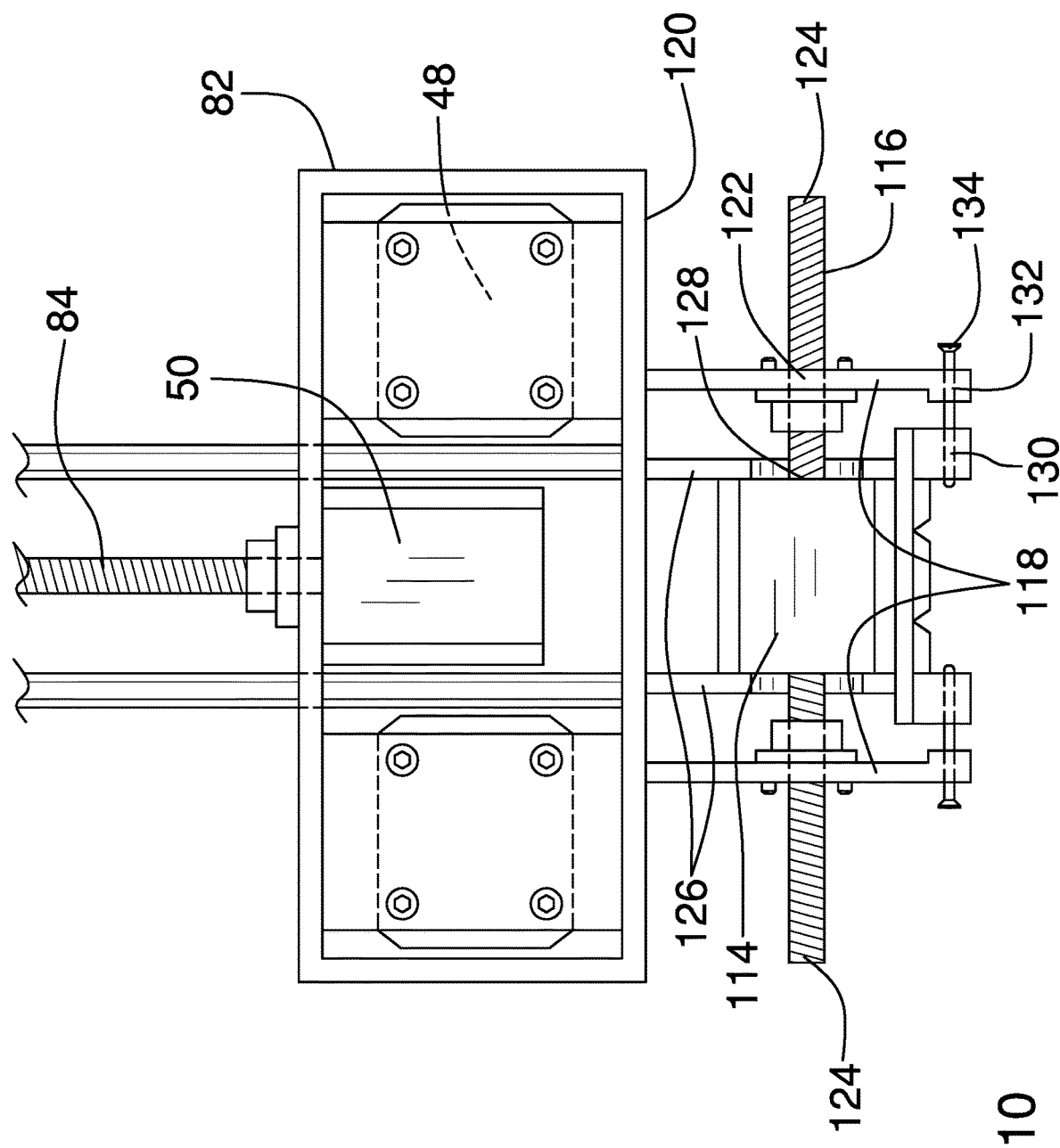
FIG. 10 is a front view of an embodiment of the disclosure.

The tool 16 may comprise a claw 112, as shown in FIG. 10, or other object attachment means, such as, but not limited to, suction devices, electromagnets, reversible couplers, and the like. The claw 112 may comprise a slave motor 114, a transfer shaft 116, and a pair of arms 118. The arms 118 are slidably engaged to the slave robot 82 and extends from a bottom 120 thereof. Each arm 118 has a first orifice 122 positioned therethrough, which is threaded. The slave motor 114 is engaged to the bottom 120 of the slave robot 82 and is electrically coupled to the rail 12. The transfer shaft 116 is engaged to the slave motor 114, is externally threaded, and extends through the first orifices 122 so that the transfer shaft 116 is threadedly engaged to the arms 118. The slave motor 114 is positioned to rotate the transfer shaft 116, which is opposingly threaded proximate to opposed ends 124 thereof, to selectively motivate the arms 118 inwardly to attach to the object.

The slave motor 114 may be engaged to and extend between plates 126 of a pair of plates 126, which are coupled to and extend from the bottom 120 of the slave robot 82. Each plate 126 has a second orifice 128 positioned therethrough. The transfer shaft 116 extends the second orifices 128.

Each plate 126 may have a third orifice 130 positioned therethrough and each arm 118 may have a fourth orifice 132 positioned therethrough so that the fourth orifice 132 is aligned with an associated third orifice 130. The fourth orifice 132 and the associated third orifice 130 have a tracking rod 134 positioned therethrough. The tracking rods 134 are positioned to guide the arms 118 as the arms 118 are selectively motivated inwardly to attach to the object.

The present invention anticipates a sensor 136 engaged to at least one of the rail 12, the robotic unit 14, and the tool 16. The sensor 136 is configured for at least one of position sensing, proximity sensing, and distance sensing, and thus is configured to determine a relative position of the robotic unit 14.

The rail 12, the robotic unit 14, and the tool 16 may be intended for at least one of manufacturing automation and warehouse automation. The rail 12, the robotic unit 14, and the tool 16 also may be intended for storage and retrieval in a warehouse. The rail 12, the robotic unit 14, and the tool 16 also may be intended for woodworking automaton, Computer Numerical Control machining, etching, welding, cutting, grinding, edging, tooling, and the like.

The present invention anticipates the rail 12 being one of a plurality of rails 12 and the robotic unit 14 being one of a plurality of robotic units 14. The rails 12 of the plurality of rails 12 are interconnected and define a three-dimensional space 138, as shown in FIG. 11. Each robotic unit 14 has an associated tool 16 engaged thereto. The transceiver 54 of each robotic unit 14 is configured to receive independent locating and tooling commands wirelessly from the control unit. The plurality of robotic units 14 therefore is configured to perform multiple tasks, at multiple locations, within or proximate to the three-dimensional space 138.

In use, the driving robots 78 position the working robot 80 within a plane 140 defined by the pair of siderails 74. The working robot 80 can then navigate along the crossrail 76 to a position required for performance of the task at the location. The slave robot 82 can extend from the working robot 80 to a position required to complete the task.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

We claim:

1. A wirelessly powered and controlled robotic apparatus comprising:
   a rail comprising a first path and a second path, wherein the rail is configured for carrying an electrical current; and
   a robotic unit engaged to the rail such that the robotic unit is electrically coupled to the rail, the robotic unit comprising:
      a microcontroller,
      a drive motor operationally engaged to the microcontroller,
      a transfer unit operationally engaged to the drive motor and the rail and being positioned for translating rotation of the drive motor to a force for motivating the robotic unit along the rail, such that the microcontroller is positioned for selectively actuating the transfer unit for motivating the robotic unit along the rail to a location, and
      a transceiver operationally engaged to the microcontroller, wherein the transceiver is configured for receiving locating commands wirelessly from a control unit, and for transmitting data thereto, such that the robotic unit is wirelessly controlled and powered.

2. The wireless powered and controlled robotic apparatus of claim 1, further including a tool engaged to the robotic unit and being configured for performing a task at, or proximate to, the location.

3. The wireless powered and controlled robotic apparatus of claim 1, further including:
   the rail comprising at least one of a first type and a second type;
   the rail of the first type comprising:
      a first rod providing the first path,
      a second rod providing the second path and extending in parallel with the first rod, and
      a threaded rod extending in parallel with the second rod and the first rod;
   the rail of the second type comprising:
      a first track providing the first path, and
      a second track providing the second path and extending in parallel with the first track, the second track and the first track each defining a slot, the slot extending longitudinally along the rail,
   the robotic unit comprising at least one of a first configuration and a second configuration;
   the robotic unit of the first configuration comprising:
      a pair of first blocks engaged to the robotic unit, each first block having a first channel extending therethrough, such that the first channels are parallel, each of the second rod and the first rod being positioned through an associated first channel,
      a set of connecting flanges engaged to the pair of first blocks such that each connecting flange extends into an associated first channel, each connecting flange being operationally engaged to the microcontroller and being positioned for slidably engaging a respective one of the first rod and the second rod, for electrically engaging the robotic unit to the rail,
      a second block engaged to the robotic unit, the second block having a second channel extending therethrough, such that the second channel is parallel with the first channels, the threaded rod being positioned through the second channel, and
      the transfer unit comprising a drive shaft engaged to the drive motor, the drive shaft being hollow and internally threaded, the threaded rod extending through the drive shaft such that the threaded rod is threadedly engaged to the drive shaft, such that the drive motor is positioned for rotating the drive shaft for motivating the robotic unit along the rail; and
   the robotic unit of the second configuration comprising:
      a set of brushes engaged to the robotic unit, each brush being operationally engaged to the microcontroller and being positioned for slidably engaging a respective one of the first track and the second track, for electrically engaging the robotic unit to the rail,
      the transfer unit comprising a drive wheel engaged to the drive motor and the rail, such that the drive motor is positioned for rotating the drive wheel for motivating the robotic unit along the rail, and
      a set of guide wheels rotationally engaged to the robotic unit, each guide wheel being positioned in a respective slot, such that the set of guide wheels is positioned for engaging the robotic unit to the rail.

4. The wireless powered and controlled robotic apparatus of claim 3, further including:
   the rail comprising:
      a pair of siderails, the siderails being coplanar and parallel, the siderails being at least one of the first type and the second type, and
      a crossrail, the crossrail being of at least one of the first type and the second type; and
   the robotic unit comprising:
      a pair driving robots engaged singly to the siderails of the pair of siderails, the crossrail being engaged to and extending between the driving robots, such that the crossrail is electrically coupled to at least one of the driving robots, the driving robots comprising at least one of the first configuration and the second configuration, and
      a working robot engaged to the crossrail such that the working robot is electrically coupled to the crossrail, the working robot being of the first configuration.

5. The wireless powered and controlled robotic apparatus of claim 4, further including a tool engaged to the working robot and being configured for performing a task at, or proximate to, the location.

6. The wireless powered and controlled robotic apparatus of claim 5, further including the robotic unit also comprising a slave robot engaged to and selectively extendible from the working robot, the tool being engaged to the slave robot, such that the slave robot is positioned for actuating the tool for performing the task at the location.

7. The wireless powered and controlled robotic apparatus of claim 6, further including:
   the slave robot comprising a threaded shaft engaged to and extending from the drive motor, the threaded shaft being positioned through a threaded channel positioned vertically through the working robot, such that the threaded shaft is operationally engaged to the working robot;
   a pair of guide rods coupled to the slave robot and extending in parallel with the threaded rod, each guide rod extending through an associated guide channel positioned vertically through the working robot; and
   a set of connecter flanges engaged to the working robot such that each connecter flange extends into an associated guide channel, each connecter flange being operationally engaged to the microcontroller of the working robot and being positioned for slidably engaging a respective guide rod, such that the pair of guide rods is electrically coupled to the rail, for electrically engaging the slave robot to the rail.

8. The wireless powered and controlled robotic apparatus of claim 6, further including:
a pair of lift motors engaged to the working robot such that the lift motors are electrically coupled to the rail;
a pair of pulleys engaged singly to the lift motors such that the pulleys are electrically coupled to the rail;
a pair of cables engages singly to the pulleys such that the cables are electrically coupled to the rail, each cable extending from the pulley through an associated hole in the working robot, such that a distal terminus of the cable is positioned below the working robot; and
the slave robot being engaged to the distal termini of the cables, such that the working robot is positioned for selectively actuating the lift motors for lowering the slave robot to a position below the working robot, positioning the slave robot for actuating the tool for performing the task at the location.

9. The wireless powered and controlled robotic apparatus of claim 8, further including:
a sub-rail engaged to and extending perpendicularly from a lower face of the working robot;
a guide rail engaged to a surface proximate to the location and extending perpendicularly therefrom, such that the microcontrollers are positioned for selectively actuating the drive motors of the driving robots and the working robot for motivating the robotic unit along the siderails and crossrail, respectively, such that the sub-rail is substantially linearly aligned with the guide rail defining a gap; and
the slave robot being selectively engageable to the sub-rail and the guide rail, wherein the slave robot is configured for traversing the gap, such that the slave robot is selectively positionable upon one or the other of the sub-rail and the guide rail.

10. The wireless powered and controlled robotic apparatus of claim 6, further including the tool being configured for selectively attaching to an object, positioning the object for being lifted toward the working robot.

11. The wireless powered and controlled robotic apparatus of claim 10 wherein the tool comprises a claw, the claw comprising:
a pair of arms slidably engaged to the slave robot and extending from a bottom thereof, each arm having a first orifice positioned therethrough, the first orifice being threaded;
a slave motor engaged to the bottom of the slave robot and being electrically coupled to the rail; and
a transfer shaft engaged to the slave motor, the transfer shaft being externally threaded and extending through the first orifices, such that the transfer shaft is threadedly engaged to the arms, such that the slave motor is positioned for rotating the transfer shaft for selectively motivating the arms inwardly for attaching to the object.

12. The wireless powered and controlled robotic apparatus of claim 11, further including:
a pair of plates coupled to and extending from the bottom of the slave robot, the slave motor being engaged to and extending between the plates, each plate having a second orifice positioned therethrough, the transfer shaft extending the second orifices, each plate having a third orifice positioned therethrough; and
each arm having a fourth orifice positioned therethrough such that the fourth orifice is aligned with an associated third orifice, the fourth orifice and the associated third orifice having a tracking rod positioned therethrough, such that the tracking rod is positioned for guiding the arm as the arm is selectively motivated inwardly to attach to the object.

13. The wireless powered and controlled robotic apparatus of claim 1, further including a sensor engaged to at least one of the rail, the robotic unit, and the tool, the sensor being configured for at least one of position sensing, proximity sensing, and distance sensing, wherein the sensor is configured for determining a relative position of the robotic unit.

14. The wireless powered and controlled robotic apparatus of claim 3, further including:
a bar extending in parallel with the first track and the second track; and
a connector engaged to and extending between the first track and the second track, the connector being electrically insulating such that such that both the first track and the second track are insulated from the bar.

15. The wireless powered and controlled robotic apparatus of claim 1, wherein the rail, the robotic unit, and the tool are intended for at least one of manufacturing automation and warehouse automation.

16. The wireless powered and controlled robotic apparatus of claim 15, wherein the rail, the robotic unit, and the tool are intended for storage and retrieval in a warehouse.

17. The wireless powered and controlled robotic apparatus of claim 1, wherein the rail, the robotic unit, and the tool are intended for woodworking automaton, Computer Numerical Control machining, etching, welding, cutting, grinding, edging, and tooling.

18. The wireless powered and controlled robotic apparatus of claim 1, wherein the rail is one of a plurality of rails, the rails being interconnected defining a three-dimensional space.

19. The wireless powered and controlled robotic apparatus of claim 1, wherein the robotic unit is one of a plurality of robotic units, each robotic unit having an associated tool engaged thereto, wherein the transceiver of each robotic unit is configured for receiving independent locating commands and tooling commands wirelessly from the control unit, such that the plurality of robotic units is configured for performing multiple tasks at multiple locations within or proximate to the three-dimensional space.

* * * * *